(12) United States Patent
Lee (10) Patent No.: US 7,619,992 B2
(45) Date of Patent: Nov. 17, 2009

(54) LOW LATENCY WORKING VPLS

(75) Inventor: Cheng-Yin Lee, Ottawa (CA)

(73) Assignee: Alcatel Lucent, Paris (FR)

( * ) Notice: Subject to any disclaimer, the term of this patent is extended or adjusted under 35 U.S.C. 154(b) by 589 days.

(21) Appl. No.: 11/224,057

(22) Filed: Sep. 13, 2005

(65) Prior Publication Data

US 2007/0058622 A1    Mar. 15, 2007

(51) Int. Cl.
H04L 12/28    (2006.01)
(52) U.S. Cl. ................. 370/256; 370/389; 370/392; 370/395.54
(58) Field of Classification Search .............. None
See application file for complete search history.

(56) References Cited

U.S. PATENT DOCUMENTS

| 5,088,090 | A | 2/1992 | Yacoby | |
|---|---|---|---|---|
| 6,603,769 | B1 * | 8/2003 | Thubert et al. | 370/401 |
| 6,631,137 | B1 * | 10/2003 | Lorrain et al. | 370/401 |
| 6,747,979 | B1 * | 6/2004 | Banks et al. | 370/401 |
| 7,126,949 | B2 * | 10/2006 | Tingle et al. | 370/392 |
| 7,339,929 | B2 * | 3/2008 | Zelig et al. | 370/390 |
| 7,463,597 | B1 * | 12/2008 | Kompella | 370/256 |
| 2005/0213572 | A1 * | 9/2005 | Huang et al. | 370/389 |
| 2006/0221950 | A1 * | 10/2006 | Heer | 370/389 |
| 2007/0008982 | A1 * | 1/2007 | Voit et al. | 370/401 |

FOREIGN PATENT DOCUMENTS

EP    0 980 167    2/2000

OTHER PUBLICATIONS (Ying-Dar Lin, et al.), "Brouter: the transparent bridge with shortest path in interconnected LANs", Oct. 14, 1991, pp. 175-183.
(Seifert W. M.), "Integratred routing (and bridging)", Oct. 10, 1989, pp. 270-277.

(Continued)

Primary Examiner—Michael J Moore, Jr.
(74) Attorney, Agent, or Firm—Kramer & Amado, P.C.

(57) ABSTRACT

A system and method are provided for forwarding packets through a fully meshed communication network when the destination MAC address may not be known. Each network element maintains a mapping of MAC addresses and IP addresses, each MAC address having an associated IP address which indicates to where packets are to be forwarded. If a network element receives a packet but has not yet associated an IP address with the destination MAC address of the packet, then the network element forwards the packet along a tree. If a network element receives a packet and has associated an IP address with the destination MAC address, in other words has learned of the IP address for the MAC address, the network element sends the packet directly to the IP address unless a direct link to the IP address is not available. If a direct link is not available, the network element forwards the packet along the tree. A network element receiving a packet from an attachment circuit encapsulates its own IP address in the message, permitting other network elements to learn of the IP address associated with the source MAC address. The invention provides reliable forwarding of packets to both known and unknown destination MAC addresses, while taking advantage of shortest paths provided by a fully meshed network.

7 Claims, 4 Drawing Sheets

OTHER PUBLICATIONS (Perlman R.), "Interconnections: Bridges and Routers, Transparent Bridges" Interconnections: Bridges and Routers, Reading, Addison Wesley, 1992, pp. 43-97.

(Perlman R.), "Interconnections: Bridges and Routers, Source Routing Bridges" Interconnections Bridges and Routers, Reading Addison Wesley, 1992, pp. 99-120.

(Perlman R.) "Interconnections: Bridges and Routers, To Route or to Bridge: Is That the Question?", Reading Addiston Wesley, 1992, pp. 359-367.

Perlman, R., et al., RBridges: Transparent Routing, Network Working Group, Aug. 2005.

* cited by examiner

LOW LATENCY WORKING VPLS

FIELD OF THE INVENTION

The invention relates to emulated LAN services, and more particularly to traffic forwarding within such services.

BACKGROUND OF THE INVENTION

IEEE 802.1ad (as well as IEEE 802.1d) provides a method by which Network Elements (NEs) learn the locations of MAC addresses. A forwarding tree is generated, which includes all the nodes (NEs, host nodes, etc) in the network. Each NE also maintains a mapping of MAC addresses to ports on the NE. When an NE receives a packet for an unknown destination the NE broadcasts the packet to all of the next nodes in the tree, if any. The NE also notes from over which port the packet came, and if the source MAC address of the packet is also unknown the NE updates its mapping (also known as a forwarding table) to relate the MAC address and the port. Eventually the NE supporting the destination MAC address receives the packet and forwards the packet to its attachment circuit. In this way, traffic to an unknown destination MAC address eventually reaches the appropriate host node. Each NE also learns over which port the source MAC address can be reached, and subsequent packets destined for the source MAC address are sent only over the port indicated by the mapping, rather than being broadcast over the tree.

The method provided by IEEE 802.1ad provides for address learning of MAC addresses and forwarding of packets to the appropriate host nodes. Being tree-based, the forwarding of packets having an unrecognized address avoids loops. However, since the address learning of IEEE 802.1ad is tree-based, all forwarding of packets also follows the branches of the tree. There is no guarantee that the paths followed by forwarded packets are the shortest paths. Although recent improvements to IEEE 802.1ad have improved the chances that the paths in the tree represent the shortest paths, there is still no guarantee. One limitation is that generation of the tree assumes that all links are symmetric with respect to cost metrics, which may not always be the case.

Another method of providing address learning is provided by IETF full-meshed VPLS. In IETF full-meshed VPLS, all NEs are in communication with all other NEs of the network. A first NE which receives a packet having an unrecognized destination MAC address forwards the packet to every other NE. Each NE forwards the packet to its respective attachment circuit, but does not forward the packet to other NEs since the NE realizes that all other NEs have already received the packet. If the source MAC address is also unknown to an NE, the NE updates its mapping to show that the source MAC address can be reached through the port over which the packet arrived. Thereafter, any packet arriving at an NE is forwarded over the port indicated by the mapping.

Since a packet having an unrecognized source MAC address arrives directly from the NE supporting that source MAC address, IETF full-meshed VPLS provides shortest paths when learning addresses for subsequent forwarding of packets. In addition, the broadcast to all NEs in the mesh ensures that packets having an unknown destination MAC address will reach their destination. However, since the method relies on broadcast to all NEs in the network, the method does not scale very well.

Furthermore, VPLS requires all NEs to be fully connected using pseudowires, which conceptually are tunnels. If a tunnel does not work, the VPLS cannot emulate the LAN service and the VPLS is said to have only partial mesh connectivity. In such a case, a NE may black-hole traffic intended for another NE if routers on the NEs are using OSPF or IS-IS with broadcast mode. If a first site A has working pseudowires to all sites, including a site B having a designated router, but not to a site C, site A will still receive link state advertisements from a router at site C via the designated router at site B. However, no data can be sent from site A to site C since there is no working pseudowire between site A and site C, and site A will not realize that no traffic is reaching site C.

Yet another method of address learning is RBridges, described in Perlman et al., "RBridges: Transparent Routing", IETF Network Working Group Internet Draft, draft-perlman-rbridge-02.txt, Feb. 19, 2005. However, RBridges provide no mechanism for sending known frames on a tree in the event that a direct link fails and a NE is unreachable, although RBridge does send unknown destination MAC addresses on a tree. In other words, RBridges would also have the partial mesh connectivity problem.

A method of combining the tree nature for address learning with the fully-meshed aspect of data delivery would ensure robust address learning in the event of link failure, while ensuring that data is delivered over shortest paths.

SUMMARY OF THE INVENTION

In accordance with one aspect of the invention, a method is provided for forwarding a packet in a communication network. A destination MAC address of the packet is determined. It is determined whether the destination MAC address is known. If the destination MAC address is not known, the packet is forwarded over a tree of network elements. If the destination MAC address is known, a destination IP address associated with the destination MAC address is determined. The availability of a direct link to the destination IP address is determined. If the destination MAC address is known and the direct link to the destination IP address is available, the packet is sent directly to the destination IP address. If the destination MAC address is known and the direct link to the destination IP address is not available, the packet is forwarded over the tree of network elements.

In accordance with another aspect of the invention, a network element in a communication network is provided. The network element includes a mapping of at least one MAC address and at least one IP address, each MAC address having a corresponding IP address. The network element includes means for receiving a packet, the packet having a destination MAC address. The network element includes means for determining whether the destination MAC address has an entry in the mapping. The network element includes means for forwarding the packet over a tree of network elements, in the event that the destination MAC address does not have an entry in the mapping. The network element includes means for determining a destination IP address associated with the destination MAC address from the mapping. The network element includes means for determining whether a direct link to the destination IP address is available. The network element includes means for sending the packet directly to the destination IP address, in the event that the direct link to the destination IP address is available. The network element includes means for forwarding the packet over the tree of network elements, in the event that the direct link to the destination IP address is not available.

Apparatus are provided for carrying out the methods of the invention. The methods may be stored in the form of software instructions stored on computer-readable media.

The methods and apparatus of the present invention allow existing routers and bridges to work in the event of a partial mesh. If an NE on the direct path is not reachable, the frame is sent on a tree. The advantages of full mesh connectivity are still taken advantage of for normal distribution of traffic.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
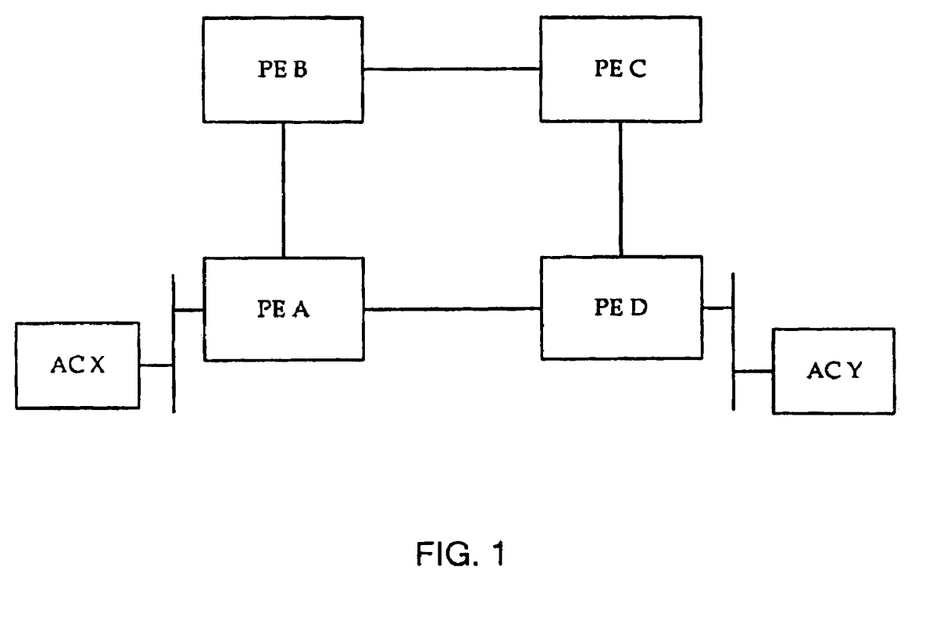
FIG. 1 is a diagram of an example communication network.

Referring to FIG. 1, an example communication network is shown. The network includes a number of provider edges as network elements. A provider edge (PE) A provides communication access to an attachment circuit (AC) X. AC X includes a plurality of end user devices. A PE D provides communication access to an AC Y, which also includes a plurality of end user devices. The network also includes PE B and PE C. Communication links exist between PE A and PE B, between PE B and PE C, between PE C and PE D, and between PE A and PE D. Each PE has a respective Internet Protocol (IP) address. Each end user device within each AC has a respective media access control (MAC) address. The communication network of FIG. 1 is a simplified example, and in general there will be any number of PEs, any of which may have communication links to any number of other PEs.

Figure 2:
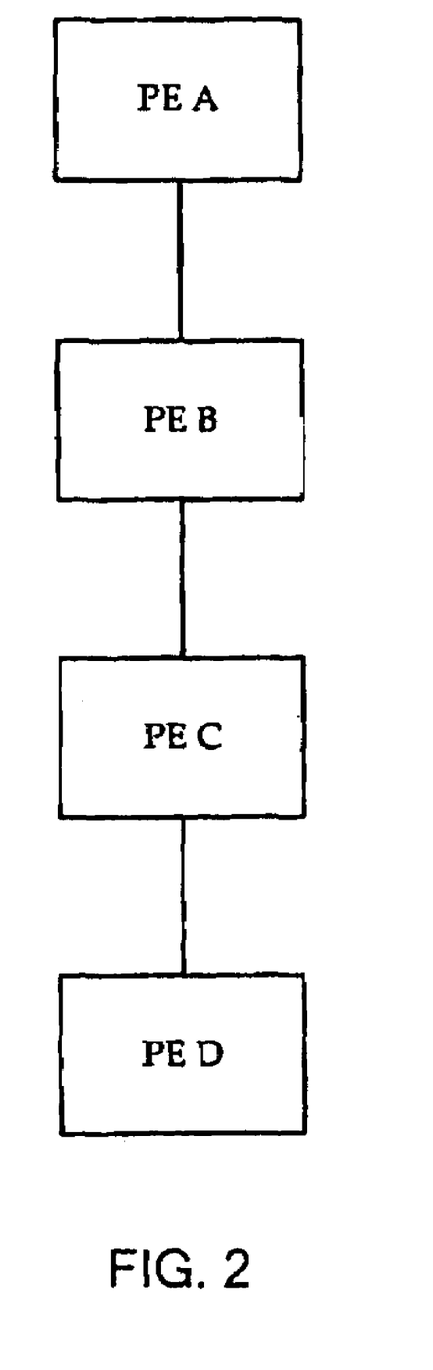
FIG. 2 is a diagram of an example tree for provider edge A in the communication network of FIG. 1.

Referring to FIG. 2, an example tree for PE A of FIG. 1 is shown. It can be seen that PE A cannot communicate with PE D directly if the paths dictated by the tree are used, even though a communication link exists between PE A and PE D in the example network (of FIG. 1).

Each PE maintains a first mapping relating MAC addresses with IP addresses, each MAC address having one related IP address. Each PE also maintains a second mapping relating MAC addresses with ports on the PE, each MAC address having one related port. In general, the MAC addresses within the first mapping are distinct from the MAC addresses in the second mapping.

Figure 3:
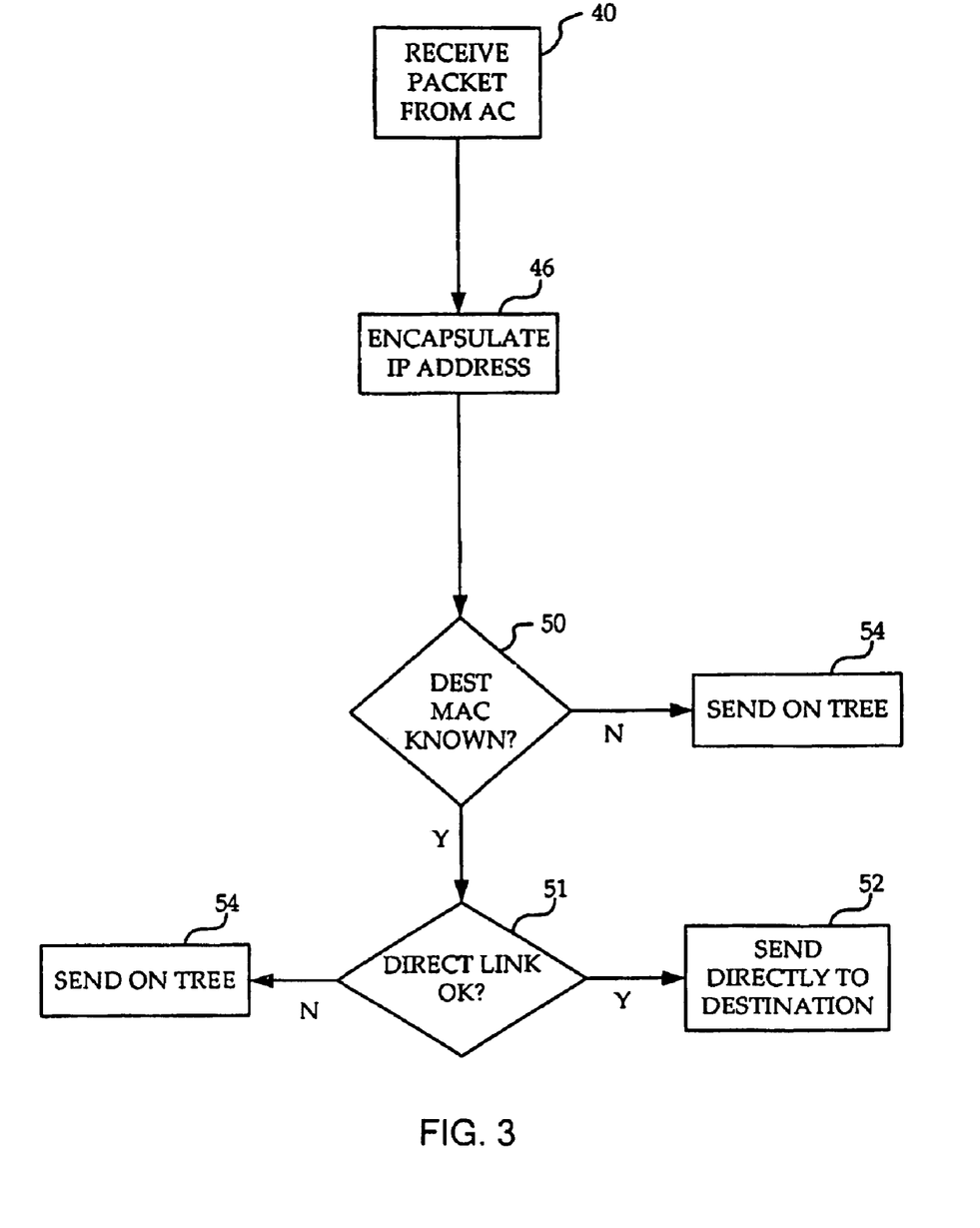
FIG. 3 is a flowchart of a method carried out by a provider edge of FIG. 1 upon receipt of a packet from an attachment circuit according to one embodiment of the invention.

Referring to FIG. 3, a flowchart of a method carried out by any PE upon receipt of a packet from the PE's AC according to one embodiment of the invention is shown. At step 40 the PE receives a packet from the AC of the PE. The packet includes a source MAC address and a destination MAC address.

At step 46, the PE encapsulates the IP address of the PE within the packet. The IP address of the PE can be encapsulated as part of a control word, and its presence signaled when a label switched path is established. This encapsulation allows other PEs to update their respective mappings of the source MAC address to the IP address of this PE.

Once the IP address of the PE has been encapsulated within the packet, then at step 50 the PE determines whether the destination MAC address is known by determining whether the destination MAC address has an entry within the first mapping. If there is such an entry in the first mapping, then the PE has previously learned to which IP address to send the packet (as will be described below with reference to FIG. 4). More generally, the destination MAC address is known if the destination MAC address has a known associated destination IP address. At step 51 the PE determines whether the direct link to the IP address corresponding to the destination MAC address in the first mapping is available or whether it has failed. The PE may determine this, for example, using bidirectional failure detection. If the direct link to the destination IP address is available, then at step 52 the PE sends the packet directly to a PE having the destination IP address, preferably along a shortest path to the destination PE.

If on the other hand the destination MAC address is not known at step 50, indicated by absence of the destination MAC address from the first mapping, then the PE sends the packet to the PEs specified by the tree. The PE also sends the packet to the PEs specified by the tree if the destination MAC address is known at step 50 but the PE determines at step 51 that the direct link to the destination IP address has failed.

A second process runs to update the second mapping for the source MAC address, preferably independently of the method for determining how to forward the packet to the destination MAC address described above. When the PE receives the packet from the AC, the PE determines whether the source MAC address is known to the PE by determining whether the source MAC address has an entry within the second mapping. If there is no such entry in the second mapping, then this is the first time that traffic from the source MAC address has been received at the PE. The PE updates the second mapping to indicate on which port future traffic destined for the source MAC address is to be transmitted.

Figure 4:
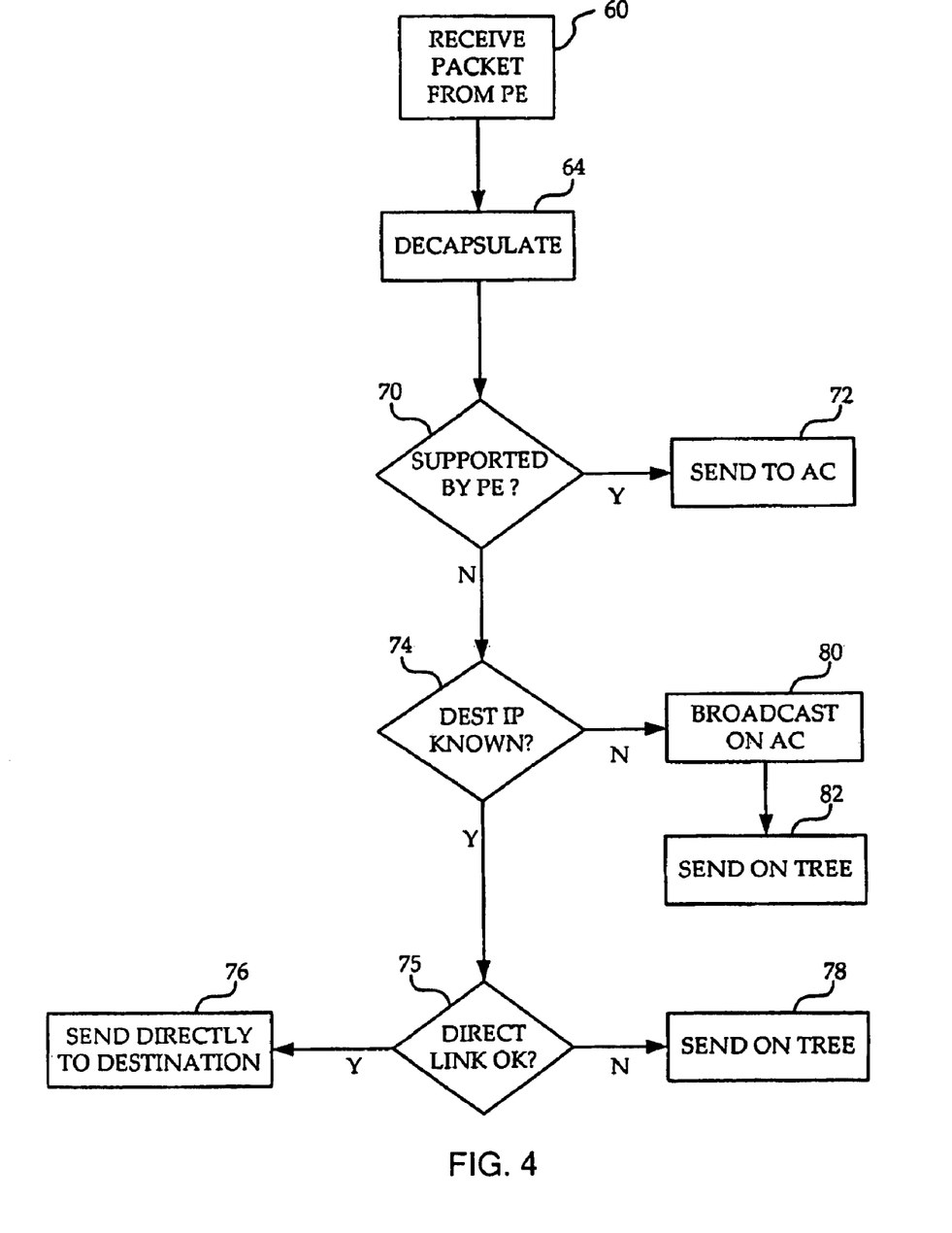
FIG. 4 is a flowchart of a method carried out by a provider edge of FIG. 1 upon receipt of a packet from another provider edge according to one embodiment of the invention.

Referring to FIG. 4, a flowchart of a method carried out by any PE upon receipt of a packet from another PE according to one embodiment of the invention is shown. At step 60 the PE receives a packet from another PE, as opposed to an AC of the PE. As above, the packet contains a source MAC address and a destination MAC address. At step 64 the PE decapsulates the packet and retrieves the source IP address.

At step 70 the PE determines whether the destination MAC address is supported by the PE by determining whether an entry for the destination MAC address exists within the second mapping. If such an entry exists, then at step 72 the PE sends the packet over the port identified for the destination MAC address within the second mapping.

If the destination MAC address is not supported by the PE, then at step 74 the PE determines whether a destination IP address is known for the destination MAC address by determining whether an entry for the destination MAC address exists within the first mapping. If such an entry exists, then the PE retrieves the destination IP address for the destination MAC address. At step 74 the PE determines whether a direct link to the destination IP address is available or whether it has failed. The PE may determine this, for example, using bidirectional failure detection. If a direct link to the destination IP address is available, then at step 76 the PE re-encapsulates the packet with the source IP address and sends the packet directly to a destination PE having the destination IP address, preferably over a shortest path to the destination PE. If a direct link to the destination IP address has failed, then at step 78 the PE re-encapsulates the packet with the source IP address and sends the packet to other PEs specified by the tree.

If the PE determines at step 74 that no entry for the destination MAC address exists in the first mapping, then the destination MAC address is unknown to the PE. At step 80 the PE broadcasts the packet to its AC, and at step 82 the PE re-encapsulates the packet with the source IP address and sends the packet to other PEs specified by the tree.

A second process runs to update the first mapping for the source MAC address, preferably independently of the method for determining how to forward the packet to the destination MAC address described above. The PE determines whether the source MAC address is known by determining whether an entry exists for the source MAC address within the first mapping. If the source MAC address is not known, then the PE updates the first mapping by adding an entry relating the source MAC address with the source IP address. This entry is subsequently used by the PE to send any traffic destined for the source MAC address directly to the source IP address, as described above with reference to step 52 of FIG. 3.

By carrying out the methods described above, traffic to a known destination is tunneled directly to the PE supporting the destination MAC address, thereby taking advantage of optimal routing. However, if a direct link to the PE supporting the destination MAC address is not available, the packet is forwarded on a tree. Traffic to unknown destinations is sent over a tree in order to avoid looping and scaling problems inherent with broadcasting to all PEs. Address learning is accomplished by encapsulating the IP address of a source PE within a packet, and the maintenance of each PE with a mapping between IP addresses and MAC addresses.

The invention will now be described with reference to the simple example network and tree shown in FIG. 1 and FIG. 2. PE A receives a packet from AC X destined for AC Y, and none of the PEs have seen MAC address X or MAC address Y before, with the exception of PE D which knows it supports MAC address Y. PE A does not recognize the destination MAC address or the source MAC address. PE A encapsulates the IP address of PE A within the packet, and forwards it along the tree to PE B. PE B receives the packet, learns that MAC address X can be reached through IP address A, updates its mapping accordingly, and forwards the packet to the next PE in the tree, PE C. Similarly, PE C learns that MAC address X can be reached through IP address A, updates its mapping accordingly, and forwards the packet to the next PE in the tree, PE D. PE D receives the packet, updates its mapping for MAC address X and IP address A, and forwards the packet to AC Y. If PE D subsequently receives a packet from AC Y destined for AC X, PE D will have associated MAC address X with IP address A and will send the packet directly to PE A, preferably along a shortest path.

The methods of the invention are preferably carried out by software located on the provider edges, but may alternatively be carried out by hardware. More generally, the logic of the methods may be carried out by any combination of software and hardware, including processors and integrated circuits. The logic of the methods may be stored as software instructions on computer-readable media.

The invention has been described as two separate methods. Alternatively, the methods described above with reference to FIG. 3 and FIG. 4 can be combined into a single procedure triggered upon receipt of a packet, with a determination made as to whether the packet is received from an AC or from another PE. The logic of such a combined method would remain essentially the same as that described above with reference to the separate methods, although some steps may be reproducible.

The embodiments presented are exemplary only and persons skilled in the art would appreciate that variations to the embodiments described above may be made without departing from the spirit of the invention. Methods that are logically equivalent or similar to those described above may be used to implement the methods of the invention. The scope of the invention is solely defined by the appended claims.

I claim:

1. A method of forwarding a packet by a provider edge (PE) in a communication network, the method comprising:
   determining a destination media access control (MAC) address of the packet;
   determining whether the destination MAC address is known to the PE;
   if the destination MAC address is not known, forwarding the packet over a tree of network elements;
   if the destination MAC address is known, determining a destination Internet protocol (IP) address associated with the destination MAC address;
   determining whether a direct link to the destination IP address is available;
   if the destination MAC address is known and the direct link to the destination IP address is available, sending the packet directly to the destination IP address; and
   if the destination MAC address is known and the direct link to the destination IP address is not available, forwarding the packet over the tree of network elements.

2. The method of claim 1 wherein determining whether the destination MAC address is known comprises:
   maintaining a mapping of at least one MAC address and at least one IP address, each MAC address within the mapping having a corresponding IP address;
   if the mapping includes an entry for the destination MAC address, determining that the MAC address is known; and
   if the mapping does not include an entry for the destination MAC address, determining that the MAC address is not known, and wherein determining a destination IP address associated with the destination MAC address comprises retrieving from the mapping the IP address corresponding to the destination MAC address.

3. The method of claim 2 further comprising:
   determining a source MAC address of the packet;
   determining whether the packet includes a source IP address;
   if the packet includes a source IP address, updating the mapping to include an entry relating the source MAC address with the source IP address.

4. The method of claim 3 further comprising:
   determining whether the packet has arrived at a network element directly from an attachment circuit;
   if the packet has arrived directly from an attachment circuit, encapsulating an IP address of the network element as the source IP address of the packet before forwarding the packet.

5. The method of claim 1 wherein determining whether a direct link to the destination IP address is available comprises using bidirectional failure detection.

6. A network element in a communication network comprising:
   a memory containing a mapping of at least one media access control (MAC) address and at least one Internet protocol (IP) address, each MAC address having a corresponding IP address; and
   a processor configured to:
   receive a packet having a destination MAC address;
   determine whether the destination MAC address has an entry in the mapping;

forward the packet over a tree of network elements, in the event that the destination MAC address does not have an entry in the mapping;

determine a destination IP address associated with the destination MAC address from the mapping;

determine whether a direct link to the destination IP address is available;

send the packet directly to the destination IP address, in the event that the direct link to the destination IP address is available; and forward the packet over the tree of network elements, in the event that the direct link to the destination IP address is not available.

7. The network element of claim 6 wherein the processor is further configured to:

determine a source MAC address and a source IP address of the packet; and update the mapping to include the source MAC address and the source IP address.

* * * * *

UNITED STATES PATENT AND TRADEMARK OFFICE
CERTIFICATE OF CORRECTION

| | | |
|---|---|---|
| PATENT NO. | : 7,619,992 B2 | Page 1 of 1 |
| APPLICATION NO. | : 11/224057 | |
| DATED | : November 17, 2009 | |
| INVENTOR(S) | : Cheng-Yin Lee | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Fourteenth Day of December, 2010

David J. Kappos
*Director of the United States Patent and Trademark Office*